United States Patent Office 3,028,366
Patented Apr. 3, 1962

3,028,366
CATALYTIC PROCESS FOR THE PREPARATION OF SUBSTANTIALLY COLORLESS POLYMERIC GLYCOL TEREPHTHALATES
Robert Fry Engle, Jr., Media, Pa., and Herbert Ackland Pohl, Wilmington, Del., assignors to E. I. du Pont de Nemours & Company, Wilmington, Del., a corporation of Delaware
No Drawing. Filed June 26, 1956, Ser. No. 593,799
12 Claims. (Cl. 260—75)

This invention relates to an improved method for the preparation of polymeric esters and more particularly to the preparation of polymeric glycol terephthalates.

A novel class of fiber- and film-forming polymers consisting of polyesters of terephthalic acid and polymethylene glycols containing from 2 to 10 carbon atoms is disclosed in U.S. Patent 2,465,319 to Whinfield and Dickson. A commercially important example of this class is polyethylene terephthalate, which is prepared by carrying out an ester interchange reaction between ethylene glycol and dimethyl terephthalate (DMT) followed by polymerization at elevated temperatures and reduced pressures. In effecting these ester interchange and polymerization reactions various catalytic agents have been employed to accelerate the rate of reaction. However, the use of catalytic systems in polymer preparation has also been attended by the development of color in the polymer, the extent of color formation being dependent on the particular nature of the catalyst. A process for retarding the formation of color during polymerization without seriously impairing catalytic activity would be of great importance in preparing polyethylene terephthalate for many commercial uses, and this applies especially to textile uses, for which colorless or white fibers are greatly desired. Even more desirable is a polymerization in which colorless products are produced at rates even faster than heretofore attained.

An object of this invention is the provision of a process for producing polymeric esters rapidly. A further object is the production in a rapid manner of such esters which are substantially free of color. Other objects appear hereinafter.

The objects of this invention are accomplished by reacting a glycol and terephthalic acid or an ester thereof in an esterification or ester interchange reaction to produce a glycol terephthalate. This ester compound is in substantially monomeric form and is exemplified by the reaction product of ethylene glycol and dimethyl terephthalate, namely, bis-(2-hydroxyethyl) terephthalate. To such an ester is added phosphoric acid, an alkyl phosphate, a hydroxyalkyl phosphate, or an aryl phosphate. Polymerization is then conducted in the presence of a catalyst and the phosphate modifier by heating at elevated temperature under reduced pressure to remove the volatile material produced which is chiefly the glycol used, being ethylene glycol in the event bis-(2-hydroxyethyl) terephthalate is being polymerized. Polymerization is continued until a filament- or film-forming polymer is produced. The modifiers of this invention operate with the wide variety of catalysts used in the preparation of glycol terephthalate polymers, and by use of the modifiers of this invention substantially colorless polymers are produced at good reaction rates. In the preferred embodiment of the invention a glycol-soluble compound of antimony is employed as the polymerization catalyst together with the phosphate modifier.

The following examples illustrate the principles and practice of this invention and are given for illustrative purposes only. All parts and percentages are by weight unless otherwise specified.

EXAMPLE 1

The results of a series of experiments on the preparation of polyethylene terephthalate are recorded in Table I. In each case the reaction was carried out in the following manner: 50 parts of dimethyl terephthalate and 50 parts of ethylene glycol were placed in a flask together with the amount of catalyst indicated in the table (percentages calculated on the basis of anhydrous compounds). The flask was fitted with a condenser and heated at atmospheric pressure, whereupon the mixture began to evolve methanol in the range 160–180° C., the temperature depending on the catalyst and its concentration. Heating was continued at such a rate that continuous gentle ebullition was maintained until no further methanol was evolved, the final pot temperature being about 220° C. in each case. The time required for this ester interchange reaction was 1 to 1.5 hours, except for the reactions run without a catalyst (entry 5 in the table) which required 65 hours. The liquid was then introduced into a polymerization tube together with the indicated amount of modifier, and the mixture was heated at 275° C. under a vacuum of 0.5 to 1.0 mm. of mercury for the indicated length of time. A continuous stream of nitrogen was introduced through a capillary tube to agitate the mixture. At the end of the polymerization period the color of the molten polymer was compared visually with arbitrary color standards consisting of

*Table 1*

| Catalyst | Mol percent [1] | Modifier | Mol percent [1] | Pm.T.[2] | I.V.[3] | Color |
|---|---|---|---|---|---|---|
| 1. Zinc acetate | 0.053 | None | | 4 | 0.67 | 12 |
| Tetraisopropyl titanate | 0.007 | | | | | |
| Zinc acetate | 0.053 | Tri-(2-hydroxyethyl) phosphate | 0.076 | 4 | 0.65 | 5 |
| Tetraisopropyl titanate | 0.007 | | | | | |
| 2. Magnesium acetate | 0.24 | None | | 2 | 0.48 | 2 |
| Antimony trioxide | 0.020 | | | | | |
| Magnesium acetate | 0.24 | Trihexyl phosphate | 0.125 | 2 | 0.42 | 1 |
| Antimony trioxide | 0.020 | | | | | |
| 3. Zinc acetate | 0.031 | None | | 6 | 0.75 | 8 |
| Lithium hydride | 0.122 | | | | | |
| Antimony trioxide | 0.020 | | | | | |
| Zinc acetate | 0.031 | Trihexyl phosphate | 0.061 | 6 | 0.72 | 3 |
| Lithium hydride | 0.122 | | | | | |
| Antimony trioxide | 0.020 | | | | | |
| 4. Lithium hydride | 0.98 | None | | 5 | 0.36 | 5 |
| Lead monoxide | 0.017 | | | | | |
| Lithium hydride | 0.98 | Triphenyl phosphate | 0.06 | 5 | 0.41 | 3–4 |
| Lead monoxide | 0.017 | | | | | |
| 5. None | | None | | 2 | 0.30 | 7 |
| Do | | Antimony trifluoride | 0.055 | 2 | 0.50 | 9 |
| Do | | Phosphoric acid | 0.099 | 2 | 0.12 | 7 |

[1] Based on DMT.
[2] Polymerization time in hours.
[3] Intrinsic viscosity.

aqueous solutions of du Pont Pontamine Catechu 3 G dye (Color Index No. Pr. 70) according to the following system of color ratings:

0=water
1=0.00025 gram of dye per 100 ml. of solution
2=twice as much dye as 1
3=three times as much dye as 1
4=four times as much dye as 1
5=etc.

This system of color standards was designed as a measure of the yellowish to brown range of colors generally encountered in the preparation of polyethylene terephthalate.

The intrinsic viscosity of the resulting polymer, a measure of the degree of polymerization, was determined in dilute solutions of the polymer in Fomal, which comprises 58.8 parts by weight of phenol and 41.2 parts by weight of trichlorophenol.

As shown in Table I in every instance when the phosphate modifier of this invention is used together with a catalyst the polymer produced has much better color than a polymer produced under the same conditions with the same catalyst but in the absence of modifier. Entry 5 in the table is of interest in showing that catalyst-free monomer is polymerized to a greater extent in the absence of the phosphate modifier than in its presence; it may also be seen that the color produced is not affected by the phosphate modifier in the absence of any catalyst. However, as shown in the other entries in the table, the phosphate modifiers operate effectively to retard color formation arising from the presence of a catalyst without substantially affecting the catalytic effect of the catalyst.

EXAMPLE 2

Table II given below lists the results obtained in a series of autoclave preparations of polyethylene terephthalate. In each case 58 parts of dimethyl terephthalate, 40 parts of ethylene glycol and the indicated amount of catalyst were introduced into a stainless steel batch still equipped with a stirrer and a condenser. When the mixture was heated methanol was evolved, the reaction requiring from 2.5 to 4 hours depending on the catalyst and its concentration. The resulting material was transferred to a stainless steel autoclave equipped with a stainless steel stirrer, and the modifier was added in the indicated amount. The reaction mixture was heated to 275° C. and the autoclave was evacuated gradually through an ice trap and a dry ice trap to an absolute pressure of about 0.5 mm. of mercury. After polymerization at this full vacuum for the indicated period of time, the polymer was withdrawn and the molten polymer was compared with the previously described arbitrary color standards.

in Tables I and II show that phosphoric acid and its esters are useful in producing white or colorless polyethylene terephthalates. Frequently, when some catalyst systems, such as those containing compounds of antimony, lead, or arsenic, are used with such additives as phosphorus acid and the phosphites, a grayish cast to the polymer appears. This grayish color is believed to be caused by the reduction of the metallic ions to the metal. A distinct advantage of the modifiers of this invention lies in the fact that there is no such effect, and the polymers produced are entirely free of this grayish color.

EXAMPLE 3

Ninety parts of ethylene glycol was heated with 28.1 parts of dimethyl terephthalate and about 0.073 part calcium acetate monohydrate until the theoretical quantity of methanol (9.25 parts) had been removed. The resulting mixture was dissolved in water, heated to 80° C., filtered, and cooled to 50° C., whereupon crystals were obtained. The crystals were filtered off and recrystallized from water twice. Of the resulting catalyst-free bis-(2-hydroxyethyl) terephthalate 4.4 parts was placed in a vapor-jacketed glass vessel equipped with a clean stainless steel stirrer. The ester was heated for 6.5 hours at 283° C. under nitrogen at atmospheric pressure with continuous agitation by the steel stirrer at 100 r.p.m. The resulting liquid had a color of 3 units when compared with the previously described standards. In a second experiment in which 0.14 mol percent of phosphoric acid was added to the ester, only 1 unit of color was developed under the same conditions.

Phosphoric acid and its esters also are useful in inhibiting color formation resulting from adventitious catalysis by metallic impurities which might be encountered in commercial practice wherever metallic reaction vessels are used. The surprising ease with which such contamination may occur is illustrated by the above example.

In order to obtain the full effect of the modifier, it should be added to the reaction mixture early during the polymerization step, or preferably before polymerization has begun. As shown in the following example, one function of the inhibitor is to prevent or retard the development of color; when added late in the polymerization step, however, the inhibitor appears to have little or no effect on color which has already appeared.

EXAMPLE 4

Polyethylene terephthalate was prepared in an autoclave following the procedure of Example 2. The catalyst was 0.062 mol percent manganous acetate and 0.027 mol percent antimony trioxide; no modifier was used. After 3 hours at full vacuum the polymer had developed 7 units of color as compared with the color standards,

*Table II*

| Catalyst | Mol percent [1] | Modifier | Mol percent [1] | Pm.T.[2] | I.V.[3] | Color |
|---|---|---|---|---|---|---|
| 1. Magnesium formate | 0.052 | None | | 3 | 0.63 | 7 |
| Lead monoxide | 0.009 | | | | | |
| Antimony trioxide | 0.020 | | | | | |
| Magnesium formate | 0.052 | Tributyl phosphate | 0.06 | 5 | 0.65 | 4 |
| Lead monoxide | 0.009 | | | | | |
| Antimony trioxide | 0.020 | | | | | |
| 2. Lanthanum acetate | 0.023 | None | | 5 | 0.67 | 4 |
| Antimony trioxide | 0.020 | | | | | |
| Lanthanum acetate | 0.034 | Phosphoric acid | 0.095 | 6 | 0.66 | 2 |
| Antimony trioxide | 0.033 | | | | | |
| Lanthanum acetate | 0.034 | Triethyl phosphate | 0.032 | 6 | 0.64 | 1 |
| Antimony trioxide | 0.020 | | | | | |
| 3. Manganous acetate | 0.040 | None | | 4 | 0.64 | 9 |
| Antimony trioxide | 0.020 | | | | | |
| Manganous acetate | 0.040 | Tricresyl phosphate | 0.040 | 8 | 0.64 | 1 |
| Antimony trioxide | 0.020 | | | | | |
| Manganous acetate | 0.040 | Phosphoric acid | 0.065 | 8 | 0.68 | 2 |
| Antimony trioxide | 0.020 | | | | | |

[1] Based on DMT.
[2] Polymerization time in hours.
[3] Intrinsic viscosity.

Here again, when a modifier of this invention was used, higher quality polymer was obtained. The results and the intrinsic viscosity was 0.67. In another autoclave run the same catalyst system was used, but 0.060 mol percent of tricresyl phosphate was added to the reaction mixture after the ester exchange step and before polymerization had begun. The polymer developed 3 units of color after 4.5 hours at full vacuum, and the intrinsic viscosity was 0.65. In a third experiment the mixture was allowed to polymerize under full vacuum for 2 hours without a modifier; 0.060 mol percent of tricresyl phosphate was then added and polymerization under full vacuum was continued for 45 minutes. The color of the molten polymer was 8 units, and the intrinsic viscosity was 0.65.

Although the modifiers of this invention must be added to the reaction mixture before polymerization has proceeded to any great extent, it is not necessary that they be present during the ester exchange step to obtain the desired high quality polymer. In fact, it will generally be desirable to omit the modifier during ester exchange when reaction time is a factor, since phosphorus compounds retard the rate of ester exchange. In commercial practice it is desirable to carry out the ester exchange reaction continuously under essentially constant temperature conditions; in such a continuous process the inhibitory effect of phosphorus compounds on the exchange rate is especially serious since a much larger reaction vessel will be required to maintain a given withdrawal rate of product containing a given low percentage of unreacted dimethyl terephthalate.

EXAMPLE 5

To a flask equipped with a condenser was added 50 parts of dimethyl terephthalate, 50 parts of ethylene glycol, 0.03 part of zinc acetate dihydrate (0.053 mol percent based on DMT), and 0.005 part of tetraisopropyl titanate (0.007 mol percent based on DMT). The mixture was heated under atmospheric pressure; at 171° C. methanol began to distill over. Heating was continued at such a rate that continuous gentle ebullition was maintained until no further methanol was evolved, the final pot temperature being about 220° C. The reaction required 1.4 hours. The experiment was repeated with the addition to the reaction mixture of 0.045 part of tri-(2-hydroxyethyl) phosphate (0.076 mol percent based on DMT). No methanol was evolved until the temperature of the reaction mixture had reached 180° C., and 1.9 hours were required to complete the evolution of methanol.

EXAMPLE 6

The reaction chamber for a constant temperature ester exchange apparatus consisted of a stainless steel beaker, 2⅞″ in diameter and 2¼″ deep, fitted with a stainless steel cover clamped down with wing nuts and sealed with a gasket prepared from a sheet of polytetrafluoroethylene. The outside of the beaker was electroplated with copper, wound with resistance wire, and insulated. The cover was provided with openings for two thermocouple wells, an inlet tube for a stream of nitrogen gas, and a joint connecting to a column for removal of the methanol. The temperature in the reactor was controlled by a thermocouple acting through a pyrometer controller and the temperature was checked constantly with another thermocouple connected to a potentiometer. The methanol was removed through an electrically heated column equipped with a rotating strip of stainless steel gauze twisted spirally about a vertical shaft; features of this column included good separating efficiency, high throughput rate, and low holdup. The jacket temperature was maintained slightly below the boiling point of methanol (65° C.). After passing through the column, the methanol was condensed and collected.

In each run shown in Table III, a charge of 75 parts of dimethyl terephthalate and 73 parts of glycol was heated to 175° C., whereupon a preheated slurry of the indicated amount of catalyst in 11 additional parts of glycol was introduced. The temperature of the mixture was maintained at 175°±2.5° C. throughout the run, and a continuous stream of nitrogen gas was maintained to aid removal of the methanol. The reaction mixture was stirred slowly by a magnetic stirrer in a stainless steel case. The volume of methanol collected after 30, 60 and 120 minutes was recorded and the percentages based on the theoretical yield of methanol are shown in Table III.

*Table III*

| Catalyst | Mol percent (based on DMT) | Methanol recovered (percent of theoretical) | | |
|---|---|---|---|---|
| | | 30 min. | 60 min. | 120 min. |
| 1. Manganous acetate | 0.062 | 83 | 92 | 97 |
| Antimony trioxide | 0.020 | | | |
| Manganous acetate | 0.062 | 53 | 77 | 90 |
| Antimony trioxide | 0.020 | | | |
| Dibutyl hydrogen phosphate | 0.059 | | | |
| 2. Manganous acetate | 0.040 | 68 | 85 | 93 |
| Manganous acetate | 0.040 | 51 | 69 | 82 |
| Triethyl phosphate | 0.036 | | | |
| Manganous acetate | 0.040 | No reaction in 75 minutes | | |
| Phosphoric acid | 0.079 | | | |

As indicated in the above table there is more unreacted material left after a given time when the modifier is present in the interchange reaction than when it is omitted. Thus, contrary to expectations, a decided advantage is gained when the modifier is added after interchange. The more rapid production of polymer, that is, amount of polymer per unit of time, is an outstanding feature of this invention.

As can be seen from the above examples, the modifiers of this invention are added to a monomeric glycol terephthalate which has an intrinsic viscosity of substantially zero (say 0.0 to 0.15) and the heating of the modified reaction media is continued until the intrinsic viscosity of the resultant polymer is about 0.5 or higher. Generally, vacuum is applied to remove volatile material and to bring polymerization to the desired level.

Among the modifiers that may be used are the triaryl phosphates, such as triphenyl phosphate and tricresyl phosphate, and the trialkyl phosphates, such as triethyl phosphate, triisopropyl phosphate, triamyl phosphate, tributyl phosphate, and trihexyl phosphate. Still others include diphenyl ethyl phosphate, diphenyl phosphate, and dibutyl phenyl phosphate. Glycol esters of phosphoric acid, such as tri-(2-hydroxyethyl)phosphate and tri-(3-hydroxypropyl) phosphate are especially useful additives. Partially esterified phosphoric acids, such as dibutyl hydrogen phosphate and phenyl dihydrogen phosphate also are very useful. Phosphoric acid itself may be added in the form of orthophosphoric acid, pyrophosphoric acid, metaphosphoric acid, or in other forms differing in degree of hydration. One advantage of the modifiers of this invention lies in their chemical simplicity. Complicated structures are not involved. In fact it is preferred to use modifiers which do not contain nitrogen or halogen atoms such as chlorine. The modifiers of this invention are inexpensive and readily available.

Further, they are very effective and only small amounts need be used. The amount of the phosphoric acid or phosphate ester added will depend in part on the amount of catalyst used. Usually it will be desirable to use an amount in the range of about 0.05 to about 2.0 mols of modifier for each mol of catalyst, based on the total number of mols of all catalysts if more than one catalyst is used. If less than 0.05 mol is used, the effect is very small. On the other hand, the addition in excess of 2 mols will produce little additional advantage. High concentrations should be avoided, since the catalysis may be unduly retarded and polymer quality may be affected by the presence of large quantities of the phosphate modifiers. Usually it will be desirable to use no more than about 0.2 mol percent of the modifier, based on the terephthalate content of the polymer. (In the case of phosphoric acid, 0.2 mol percent corresponds to 0.101 weight percent based on the terephthalate content.) Much lower concentrations are usually employed, as shown in the examples.

The phosphate modifiers of this invention can be used with any of the well-known catalysts or catalyst combinations effective in the preparation of the polyesters. In practical applications a system of two or more catalysts will generally be used containing one or more components especially effective in promoting the ester exchange reaction between ethylene glycol and dimethyl terephthalate together with one or more additional components which are effective catalysts for the polymerization of the monomeric glycol terephthalate. Examples of catalytic materials useful in the ester exchange reaction include the alkali metals and their hydrides and compounds of certain metals, such as calcium, magnesium, lanthanum, manganese, and cobalt. Many of these catalysts also are effective in the initial stages of polymerization, but it will usually be desirable to add a specific polymerization catalyst such as antimony trioxide, as disclosed by H. R. Billica in U.S. Patent 2,647,885. Esters of titanium can also be used to catalyze the polymerization reaction. Usually the polymerization catalyst will not retard the rate of ester exchange, and where this is the case it is generally convenient to add all of the catalysts at the beginning of the reaction.

The amount of catalyst used will vary depending on the particular nature of the catalyst; however, an amount in the range of 0.01 to 0.20 mol percent will usually be employed. In the preferred embodiment of this invention, a glycol-soluble compound of antimony is employed as the polymerization catalyst owing to its high catalytic activity and low tendency towards the development of color, especially when employed with the phosphate modifiers of this invention. The effectiveness of glycol-soluble antimony compounds when employed with phosphoric acid and phosphate esters is illustrated in the examples. Usually an additional metallic compound which is effective as an ester interchange catalyst will also be present in the reaction mixture, for example manganous acetate or lanthanum acetate.

Associated with each catalyst system is a secondary catalytic effect on the reactions of color-forming bodies in the reaction mixture. It is the function of the phosphate additives of this invention to inhibit this secondary catalytic effect without seriously retarding the ability of the catalysts to function in the polymerization reaction. When the tendency of a given catalyst to produce color is high, the phosphate modifiers of this invention will usually operate to reduce the color to acceptable levels. When a catalyst having an inherently low color-forming effect is used, a still further reduction in polymer color is achieved.

Phosphoric acid and the various phosphate esters are substantially equivalent on a molar basis with regard to the inhibition of color. Mixtures of two or more of the phosphate inhibitors are effective to an extent roughly proportional to the total molar quantities used. In using the more volatile members of the group it will frequently be desirable to delay the application of vacuum to the reaction system to allow ester interchange with the glycol to take place. In processes in which the excess glycol is to be recovered and reused, it may be desirable to avoid the use of aryl esters of phosphoric acid. Phenols evolved from these compounds are carried over into the glycol recovery system and are very difficult to remove from the glycol by distillation or other common industrial purification methods. Accumulated phenols would have a deleterious effect on the ester exchange reaction rate.

Although the process and advantages of the present invention have been particularly described with respect to the preparation of polyethylene terephthalate, it should be understood that the invention is fully applicable to the polymerization of bis-(2-hydroxyethyl) terephthalate derived from whatever source and includes the preparation of modified polyethylene terephthalates, i.e., modified with small quantities, e.g., up to 20% of other dicarboxylic acids. For example, glycol, terephthalic acid, or a dialkyl ester thereof, and a second acid or ester thereof, may be reacted together to form a copolyester, the second acid being selected from the group consisting of isophthalic acid, bibenzoic acid, hexahydro terephthalic acid, adipic acid, sebacic acid, azelaic acid, the naphthalic acids, 2,5-dimethyl terephthalic acid, and bis-p-carboxyphenoxyethane.

It is also within the scope of the present invention to prepare polyesters by reacting other glycols besides ethylene glycol, such glycols being selected from the series $HO(CH_2)_nOH$ where "$n$" is an integer from 2 to 10 inclusive. Polyethylene glycols having molecular weights of about 106 to about 6,000 may also be used in polymer preparation. And, in place of dimethyl terephthalate, there may be employed as monomer any of the terephthalic esters of saturated aliphatic monohydric alcohols containing up to and including 7 carbon atoms.

The products produced by the novel process of this invention are highly desirable. They are color-free polymers which may be readily shaped into films and fibers by conventional spinning techniques, such as by melt spinning. The conditions of polymer preparation and shaping are described in the prior art. For example, such techniques are disclosed in U.S. Patent Nos. 2,465,319, 2,534,028, 2,641,592 and 2,647,885 among others.

This application is a continuation-in-part of our copending application Serial No. 383,382, filed September 30, 1953.

It will be apparent that many widely different embodiments of this invention may be made without departing from the spirit and scope thereof, and therefore it is not intended to be limited except as indicated in the appended claims.

We claim:
1. In the process of polymerizing a glycol ester of terephthalic acid in the presence of a metal-containing catalyst for the polymerization thereof to produce a linear fiber-forming polyester therefrom, the improvement of producing a polymer substantially free from color which comprises heating the said glycol ester under reduced pressure in the presence of a phosphoric compound selected from the group consisting of phosphoric acid, alkyl phosphates, hydroxyalkyl phosphates, and aryl phosphates in an amount less than 0.2 mol percent, based on the terephthalate content of the polymer, until a fiber-forming polymer is produced.

2. The process of claim 1 in which the catalyst is present in the amount of about 0.01 to 0.20 mol percent based on the terephthalate content.

3. A process of claim 2 in which the amount of said phosphoric compound is from about 0.05 to about 2.0 mols per mol of catalyst present.

4. A process of claim 1 in which the monomeric glycol ester is bis-(2-hydroxyethyl) terephthalate.

5. A process of claim 1 in which the monomeric ester has an intrinsic viscosity of substantially zero.

6. A process of claim 1 in which the said heating is continued until the said polymer has an intrinsic viscosity of at least about 0.5.

7. The process of claim 1 in which the catalyst is a glycol-soluble mounted of antimony.

8. The process of claim 7 in which the catalyst is antimony trioxide.

9. The process of producing a polymer substantially free from color which comprises subjecting a glycol and a lower alkyl ester of terephthalic acid to a catalytic ester interchange reaction by heating them in the presence of an ester interchange metal containing catalyst to form a glycol ester; adding a phosphoric compound in an amount less than 0.2 mol percent based on the terephthalate content of the polymer selected from the group consisting of phosphoric acid, alkyl phosphates, hydroxyalkyl phosphates, and aryl phosphates before the glycol ester has been polymerized to an intrinsic viscosity of about 0.15, and then polymerizing the said glycol ester by heating it in the presence of a metal containing polymerization catalyst and the said phosphoric compound under reduced pressure until a fiber-forming polymer is produced.

10. The process of claim 9 in which the said alkyl ester is dimethyl terephthalate.

11. The process of claim 9 in which the said glycol is ethylene glycol.

12. In the process of polymerizing a glycol ester of terephthalic acid in the presence of antimony oxide as a catalyst for the polymerization thereof to produce a linear fiber-forming polyester therefrom, the improvement which comprises heating the said glycol ester under reduced pressure in the presence of phosphoric acid in an amount by weight approximately equal to the amount of antimony oxide catalyst until a fiber-forming polymer is produced.

References Cited in the file of this patent

UNITED STATES PATENTS

| | | |
|---|---|---|
| 2,437,047 | Rothrock et al. | Mar. 2, 1948 |
| 2,479,951 | Marling | Aug. 23, 1949 |
| 2,650,213 | Hofrichter | Aug. 25, 1953 |

UNITED STATES PATENT OFFICE
CERTIFICATE OF CORRECTION

Patent No. 3,028,366                                        April 3, 1962

Robert Fry Engle, Jr., et al.

It is hereby certified that error appears in the above numbered patent requiring correction and that the said Letters Patent should read as corrected below.

Column 8, line 65, for "mounted" read -- compound --.

Signed and sealed this 11th day of September 1962.

(SEAL)
Attest:

ERNEST W. SWIDER
Attesting Officer

DAVID L. LADD
Commissioner of Patents